A. B. FUHR.
VEHICLE WHEEL.
APPLICATION FILED APR. 10, 1920.
1,387,148.
Patented Aug. 9, 1921.
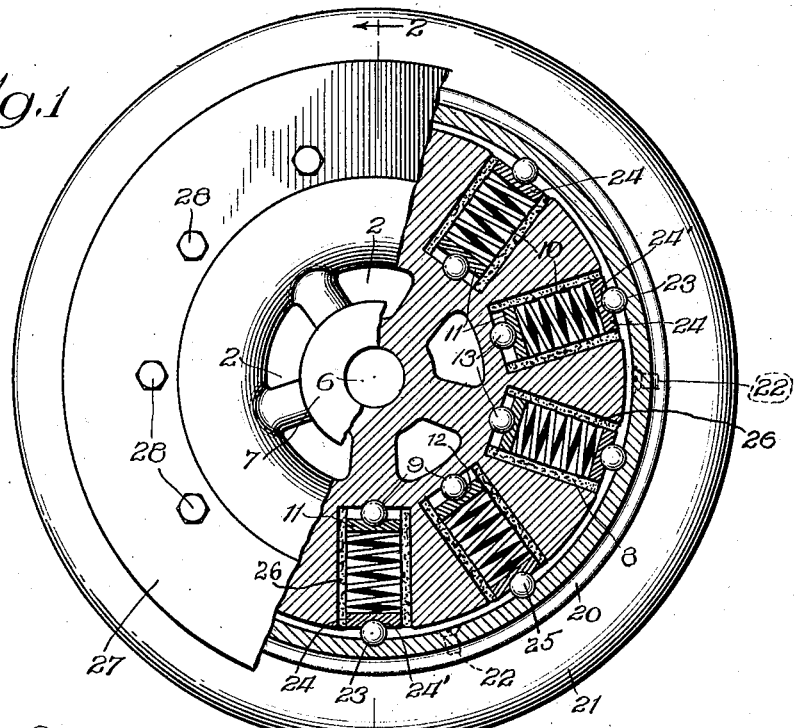
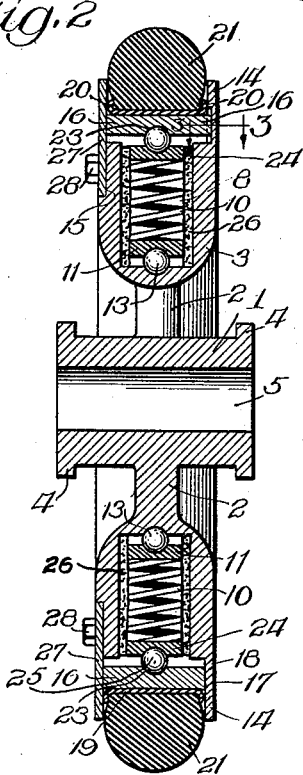
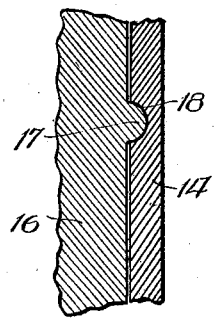
Inventor:
A. B. Fuhr
By Munn & Co.
Atty's.

UNITED STATES PATENT OFFICE.

ALBERT B. FUHR, OF MACOMB, ILLINOIS.

VEHICLE-WHEEL.

1,387,148.  Specification of Letters Patent.  Patented Aug. 9, 1921.

Application filed April 10, 1920. Serial No. 372,747.

*To all whom it may concern:*

Be it known that I, ALBERT B. FUHR, a citizen of the United States, and a resident of Macomb, in the county of McDonough and State of Illinois, have invented a new and useful Improvement in Vehicle-Wheels, of which the following is a full, clear, and exact description.

My invention relates to improvements in vehicle wheels, and it consists in the combinations, constructions and arrangements herein described and claimed.

An object of my invention is to provide an improved wheel for automobiles and other vehicles which contains in itself spring means for effectively absorbing shocks and jars encountered in service.

A further object of my invention is to provide a device of the type described, in which spring means interposed between the rim and the spokes are spaced at equal distances apart, thereby effecting a multiplied resilience at the rim relative to the resilience given out by the springs employed.

A further object of my invention is to provide a device of the type described which is strong and durable in construction, not liable to get out of order easily, and which is thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a face view of the device, a portion being broken away and other portions being shown in section, Fig. 2 is a section along the line 2—2 of Fig. 1, and Fig. 3 is a section along the line 3—3 of Fig. 2.

In carrying out my invention, I provide a hub 1 connected by radially extending spokes 2 to a web 3. In the embodiment of my invention, illustrated in the accompanying drawings, the hub 1, the spokes 2, and the web 3 are all formed or cast integrally, but it is, of course, obvious that these portions of the device could be formed separately and secured together. The hub 1 has a central bore 5 adapted to receive an axle 6, and is also formed with the customary flanges 4. The hub 1 may be secured upon the axle 6 by means of a hub cap 7 which has portions placed over the flanges 4, which are secured thereto in any approved manner, none being shown in the accompanying drawings.

The web 3 is formed with a plurality of cylindrical chambers 8 which are spaced at equal distances apart around its outer periphery, and extend radially toward the hub 1. A central socket 9 is provided in the bottom of each of the cylindrical chambers 8. A coil spring 10, which has a disk 11 secured to its lower end, is arranged within each of the cylindrical chambers 8 in such a manner as to leave a space between the coil spring and the wall of the chamber. A central socket 12 is provided in the under surface of the disk 11 and registers with the socket 9. A ball bearing 13 is disposed between the disk 11 and the bottom of the cylindrical chamber 8 and is partly received within each of the registering sockets 9 and 12.

It will be noted by referring to Fig. 2 of the accompanying drawings that the web 3 has a radially extending integral flange 14 on one side. An annular recess 15 is formed on the opposite side of the web 3 and extends inwardly from the outer edge thereof. A portion of a removable radial flange 27 is disposed within the recess 15 and is secured therein by means of a plurality of screws 28. It will be observed that the peripheral edges of the integral flange 14 and the removable flange 27 will be in alinement, and that a channel is thus provided between the flanges 14 and 27 to receive a resilient felly 16 which is arranged concentrically with respect to the hub 1. The felly 16 is fashioned with a single radially extending integral lug 17, which is received within a recess 18 in the wall of the integral flange 14. It will be noted that the recess 18 is greater in height than the width of the felly 16, whereby a movement of the latter toward and away from the direction of the hub 1 is permitted. A rim 19 is rigidly secured to the felly 16 by means of screws 22. The resilient rim 19 has the customary rim flanges 20 which are adapted to hold a tire 21 which is mounted on the rim 19. The rim flanges 20 are relatively narrow so as not to interfere with the effective operation of the resilient rim 19 which moves under stress with the resilient felly 16.

It will be noted that the outer end of each of the coil springs 10 also has a disk 24 which is rigidly secured to the end thereof. Each disk 24 has a central socket 24′. The felly 16 also has sockets 23 which are arranged to register with the sockets 24′, and the ball bearings 25 are disposed between the inner surface of the felly 16 and the disk 24, one such ball bearing being partly received within the registering sockets 24′ and 23. Consequently, it will be seen that the springs 10 will tend to maintain the felly 16 in its farthest radial position, but that movement of the latter toward the hub 1 against the tension of the springs 10 is permitted. A packing 26 is disposed between each coil spring 10 and the wall of its chamber 8.

It will, of course, be understood that the removable flange 27 is not secured, as illustrated in Fig. 2 of the accompanying drawings, until the parts described as being located within the chambers 8 and between the integral flange 14 and the removable flange 27 have been placed in position.

From the foregoing description of the various parts of the device, the operation thereof may be readily understood. When jars or shocks are occasioned by inequalities of road surface, the resiliently supported felly 16 will be forced toward the center of the wheel at diametrically opposite points, and will correspondingly move an equal distance in the opposite direction at the diametrically opposite points located at right angles to the first mentioned points. This movement will be against the tension of the springs 10 and, consequently, the shock or jar will be effectively dissipated without the hub or the parts of the vehicle supported by the axle being affected thereby. Consequently, solid tires may be used and the same benefits ordinarily associated with pneumatic tires obtained without the disadvantages incident to the use of the latter. The provision of the lug 17 movable within the recess 18 prevents "slipping" of the felly 16 relative to the inner wheel structure without suspending the inner wheel structure or precluding resiliency between the inner and outer members of the device.

The provision of ball members between disks 11 and the bottom walls of the chambers 8 and between the disks 24 and the inner periphery of the felly 16 insures the maintenance of a constant radial pressure on the inner periphery on account of the reaction of the springs 10 while affording flexibility in the means provided as described for pressing the felly 16 radially.

I claim:

1. A vehicle wheel comprising a hub, a plurality of radially extending spokes, a web formed integrally with said spokes and arranged concentrically with respect to said hub, said web having a plurality of radially extending cylindrical chambers formed therein and positioned at spaced distances apart around its periphery, having also a radially extending annular recess in one side adjacent its outer edge, and having an integral radially extending flange positioned at its opposite outer edge, said flange having a groove formed therein adjacent the periphery of the web, a closed resilient felly arranged concentrically with respect to said web, said felly having a lateral lug adapted to loosely work in said groove, resiliently yielding means disposed in the chambers formed in said web and arranged to exert an outward thrust against the inner surface of said resilient felly, a resilient rim rigidly secured to said resilient felly, a tire mounted on said rim, and a removable annular flange arranged to have its inner portion secured within said first named annular recess in said web.

2. A vehicle wheel comprising a hub, a plurality of radially extending spokes, a web formed integrally with said spokes and arranged concentrically with respect to said hub, said web having a plurality of radially extending chambers formed therein, a resilient felly arranged concentrically with respect to said web, a coil spring disposed in each of said chambers, means arranged at the ends of the coil spring for communicating the thrust of the latter against the bottom wall of the chamber and the inner wall of the resilient felly, said web and said resilient felly being provided with coacting means for preventing rotative movement of the felly relative the web while permitting said felly to move under stress toward and away from the web, and for preventing lateral displacement of said felly, and a resilient rim rigidly secured to the resilient felly and arranged concentrically therewith.

ALBERT B. FUHR.